US008176594B2

(12) United States Patent
Kim

(10) Patent No.: US 8,176,594 B2

(45) Date of Patent: May 15, 2012

(54) WIPER BLADE

(75) Inventor: In Kyu Kim, Gyeonggi-do (KR)

(73) Assignees: ADM21 Co., Ltd., Ansan-si (KR); In Kyu Kim, Ansan-si (KR)

( * ) Notice: Subject to any disclaimer, the term of this patent is extended or adjusted under 35 U.S.C. 154(b) by 1385 days.

(21) Appl. No.: 11/565,519

(22) Filed: Nov. 30, 2006

(65) Prior Publication Data

US 2007/0180642 A1 Aug. 9, 2007

(30) Foreign Application Priority Data

Nov. 30, 2005 (KR) ........................ 10-2005-0115735

(51) Int. Cl.
*B60S 1/38* (2006.01)
*B60S 1/40* (2006.01)

(52) U.S. Cl. .............. 15/250.32; 15/250.43; 15/250.201

(58) Field of Classification Search ............. 15/250.201, 15/250.43, 250.451, 250.48, 250.33, 250.32, 15/250.361

See application file for complete search history.

(56) References Cited

U.S. PATENT DOCUMENTS 3,035,298 A 5/1962 Scinta ........................ 15/250.42
3,060,480 A 10/1962 Ziegler ........................ 15/250.42
3,114,926 A 12/1963 Deibel ........................ 15/250.42
3,132,368 A 5/1964 Reese ........................ 15/250.42
3,141,186 A 7/1964 Scinta ........................ 15/250.42
3,643,286 A 2/1972 Wubbe ........................ 15/250.38
4,063,328 A 12/1977 Arman
4,075,731 A 2/1978 Harbison et al. ........... 15/250.42
4,336,625 A 6/1982 Maiocco .................... 15/250.42
4,343,063 A 8/1982 Batt ........................... 15/250.42
5,231,730 A 8/1993 Schmid et al. ............. 15/250.42
5,970,569 A 10/1999 Merkel et al. .............. 15/250.43
D443,854 S 6/2001 De Block ..................... D12/219
6,266,843 B1 * 7/2001 Doman et al. ........... 15/250.201
6,279,191 B1 * 8/2001 Kotlarski et al. ........ 15/250.201
6,799,348 B1 * 10/2004 Swanepoel et al. ........ 15/250.32
6,810,556 B1 * 11/2004 Kotlarski .................. 15/250.43

(Continued)

FOREIGN PATENT DOCUMENTS

DE 198 54 372 5/2000

(Continued)

OTHER PUBLICATIONS

Machine translation of description portion of DE 10107021 patented Aug. 22, 2002.*

*Primary Examiner* — Gary Graham

(74) *Attorney, Agent, or Firm* — Seed IP Law Group PLLC

(57) ABSTRACT

The present invention relates to a wiper blade mounted to a wiper apparatus for a vehicle to wipe a windshield. An object of the present invention is to provide a wiper blade which can be more easily assembled and manufactured by forming a connector integrally with a wiper frame. According to the present invention for achieving the object, there is provided a wiper blade coupled to a wiper arm of a vehicle to wipe a windshield, comprising a wiper strip in contact with the windshield; a wiper frame curved along its lengthwise direction and having elasticity to bring the wiper strip into contact with the windshield; and a connector formed integrally with the wiper frame and coupled with the wiper arm.

7 Claims, 5 Drawing Sheets

U.S. PATENT DOCUMENTS

| | | | | |
|---|---|---|---|---|
| 6,836,926 | B1 | 1/2005 | De Block | 15/250.43 |
| 7,007,339 | B2 * | 3/2006 | Weiler et al. | 15/250.201 |
| D524,223 | S | 7/2006 | Nakano et al. | D12/219 |
| 2006/0064840 | A1 | 3/2006 | Park | 15/250.43 |
| 2006/0090281 | A1 * | 5/2006 | Park | 15/250.43 |
| 2006/0191093 | A1 | 8/2006 | Boland et al. | 15/250.32 |
| 2007/0175017 | A1 | 8/2007 | Kim | 29/557 |
| 2007/0180643 | A1 | 8/2007 | Kim | 15/250.201 |

FOREIGN PATENT DOCUMENTS

| | | | |
|---|---|---|---|
| DE | 101 07 021 | | 8/2002 |
| DE | 10107021 | * | 8/2002 |
| DE | 202004012132 | | 11/2004 |
| EP | 0 436 510 | | 7/1991 |
| EP | 1132267 | A2 | 9/2001 |
| EP | 1757502 | A2 | 2/2007 |
| FR | 2804393 | A1 | 8/2001 |
| WO | 99/02382 | | 1/1999 |
| WO | 9911495 | A1 | 3/1999 |
| WO | 9912784 | A1 | 3/1999 |
| WO | 99/15384 | | 4/1999 |
| WO | 00/37293 | | 6/2000 |
| WO | 01/02224 | | 1/2001 |
| WO | 01/23232 | | 4/2001 |
| WO | 0204268 | A1 | 1/2002 |
| WO | 0236397 | A1 | 5/2002 |

* cited by examiner

WIPER BLADE

TECHNICAL FIELD

The present invention relates to a wiper blade mounted to a wiper apparatus for a vehicle to wipe a windshield, and more particularly, to a wiper blade, in which a wiper strip is coupled with the elastic wiper frame, a windbreak function is provided, and a connector for coupling the wiper blade with a wiper arm is formed integrally with the wiper frame.

PRIORITY INFORMATION

This application claims priority to Korean Patent Application No. 10-2005-0115735, filed Nov. 30, 2005, entitled WIPER BLADE, which application is incorporated herein by reference in its entirety.

BACKGROUND

FIG. 1 is a perspective view of a vehicle to which a conventional wiper blade is mounted, and FIG. 2 is a front view of the conventional wiper blade.

As shown in FIG. 1 and FIG. 2, the conventional wiper apparatus comprises a wiper arm 15 installed at one side of a vehicle body 10 and rotated from side to side by a wiper motor (not shown), and a wiper blade 20 mounted to the wiper arm 15, moved on and contacted with a windshield 12 to wipe it, and provided with a wiper strip 30.

The wiper blade 20 is coupled with the wiper arm 15 and is rotated within a predetermined angle range according to operation of the wiper motor. To this end, a main link 22 of the wiper blade 20 is coupled with the wiper arm 15. A plurality of intermediate links 24 are connected to the main link 22 through pins 25 for uniformly transmitting pressure of the wiper arm 15 to the main link 22. A plurality of sub links 26 are connected to the intermediate links 24 with pins 27 to connect the intermediate links 24 to the wiper strip 30. Also, clips 28 are formed at both ends of the sub link 26 and coupled with coupling grooves formed in the wiper strip 30.

Further, the wiper blade 20 is provided with a joint 29 to reduce a friction force between the main link 22 and the intermediate links 24.

In the wiper blade according to the prior art, however, a process of assembling a wiper strip as well as a structure for securing it are complicated, whereby there is a problem in that a time required for assembling the wiper blade is increased to lower a productivity of the articles. Also, in the conventional wiper blade, since the links are moved relative to each other when the wiper blade is operated, noises can be generated in the operation of the wiper blade. In addition, in the conventional wiper blade, the wiper blade is lift up from the windshield by the wind when the vehicle is driven at a high speed, which causes a problem that a contacting force between the wiper blade and the windshield is lowered. Accordingly, in order to solve the above problem, the structure in which an additional windbreak rib is installed has been proposed. However, there is a room for improvement of the wiper blade.

Technical Problem

The present invention is conceived to solve the aforementioned problems in the prior art. An object of the present invention is to provide a wiper blade, which has a wiper frame formed to have elasticity, causes a structure of a wiper frame for securing a wiper strip is simple. In addition, the wiper frame and the connector can be formed integrally with each other, its structure is simple, and a time required for the assembling and manufacturing process can be reduced.

Technical Solution

According to an aspect of the present invention for achieving the object, there is provided a wiper blade coupled to a wiper arm of a vehicle to wipe a windshield, comprising a wiper strip in contact with the windshield; a wiper frame curved in along its lengthwise direction and having elasticity to bring the wiper strip into contact with the windshield; and a connector formed integrally with the wiper frame and coupled with the wiper arm.

Here, the connector may comprise a first side wall member formed on one side of the wiper frame and a second side wall member formed on the other side of the wiper frame corresponding to the first side wall member, and the first and second side wall members may be formed to be bent in order to be coupled with the wiper arm. In addition, the wiper strip may have a coupling section formed to be inclined at a predetermined angle, the wiper frame is slantingly coupled to the coupling section, the side wall member at a downward inclined side of the wiper frame may be formed to extend therefrom more than the other side wall member to have the same level when they are bent, and the wiper strip may be formed to be reversely inclined with respect to the wiper frame to be brought into perpendicular contact with the windshield. In the meantime, the coupling section of the wiper strip may comprise a windbreak rib formed to be inclined rearward. Also, the wiper frame may comprise at least one coupling slit for coupling the wiper strip to the wiper frame, and therefore, the wiper strip is preferably formed corresponding to the coupling slit.

Further, front and rear sides of the wiper frame may be symmetrical in width with respect to the coupling slit, or any one of widths of the front and rear sides of the wiper frame may be larger than the other.

Advantageous Effects

According to a wiper blade of the present invention configured as above, there are the advantages in that a structure of a wiper frame for securing a wiper strip is simple, a process of assembling the wiper strip to the wiper frame is simple, a time required for the assembling process can be reduced, and the manufacturing costs can be remarkably reduced and the durability of the article can be significantly improved since the wiper frame is formed to have predetermined elasticity and therefore no additional part is necessary. In addition, since the wiper frame and the connector can be formed integrally with each other, its structure is simple, and a work for an additional connector and the process and cost for coupling a connector are not required. Accordingly, a cost for managing a connector can be reduced.

EXPLANATION OF REFERENCE NUMERALS FOR MAJOR PORTIONS SHOWN IN DRAWINGS

| | |
|---|---|
| 50: Wiper Blade | 60: Wiper Strip |
| 62: Body Portion | 64: Coupling Section |
| 65: Rail Groove | 66: Strip Portion |
| 69: Cut-out Portion | 70: Wiper Frame |
| 74: Coupling Aperture | 75: Coupling Slit |
| 80: Connector | 82: First Side Wall Member |
| 84: Second Side Wall Member | 85: Coupling Rod |

DETAILED DESCRIPTION

Hereinafter, preferred embodiments of the present invention will be described in more detail with reference to accompanying drawings.

Figure 3:
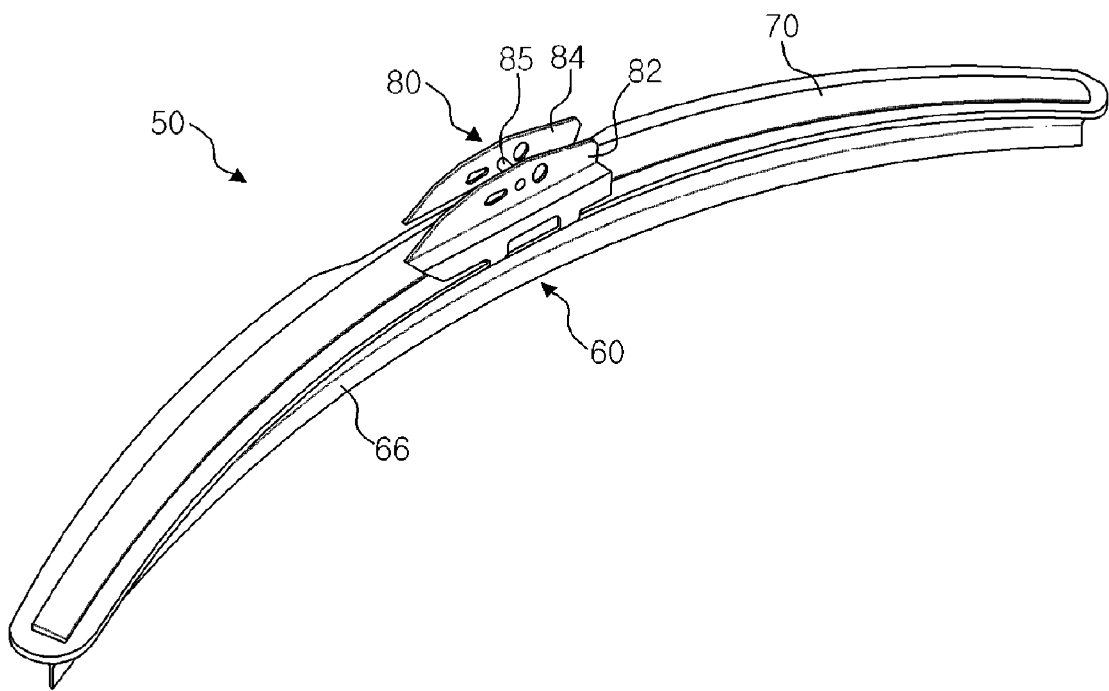
FIG. 3 is a perspective view of a wiper blade according to the present invention.
Figure 4:
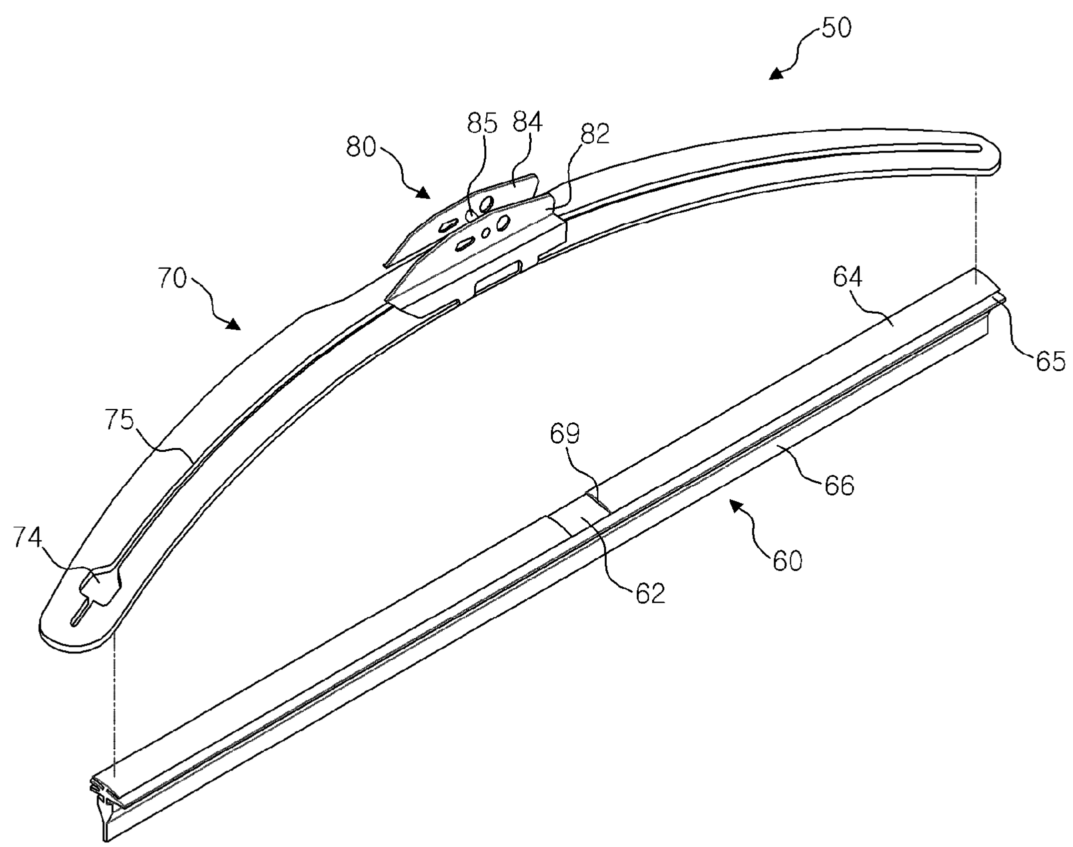
FIG. 4 is an exploded perspective view of the wiper blade according to the present invention.
Figure 5:
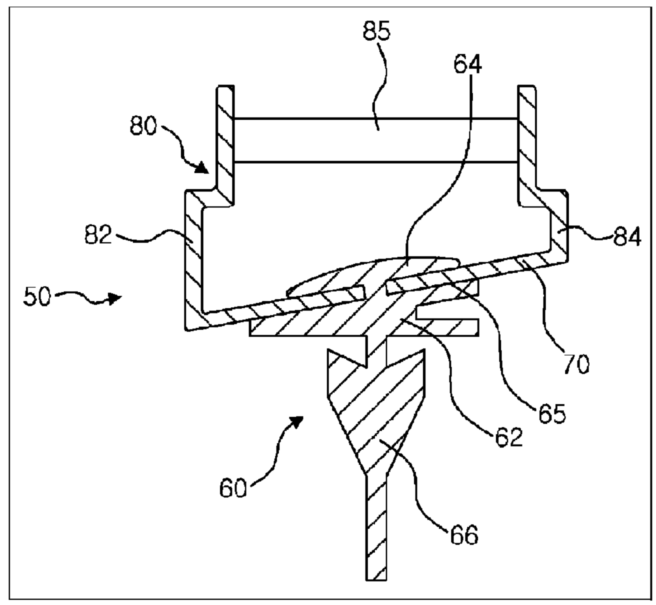
FIG. 5 is a sectional view showing a connector section of the wiper blade according to the present invention.

FIG. 3 is a perspective view of a wiper blade according to the present invention, and FIG. 4 is an exploded perspective view of the wiper blade according to the present invention. Also, FIG. 5 is a sectional view showing a connector section of the wiper blade according to the present invention, and FIG. 6 (*a*) and (*b*) are plane views showing a wiper frame of the wiper blade according to the present invention.

As shown in FIGS. 3 to 6, a wiper blade 50 according to the present invention comprises a wiper strip 60 in contact with a surface of a windshield to wipe out moisture, dust and the like got on the surface of the windshield, and a wiper frame 70 with which the wiper strip 60 is coupled.

Meanwhile, in the wiper blade 50, a connector 80 for connecting the wiper blade to a wiper arm can be formed integrally with the wiper frame 70.

That is, the connector 80 may include a first side wall member 82 formed on one side of the wiper frame 70 and a second side wall member 84 formed on the other side the wiper frame 70. The first and second side wall members 82 and 84 can be bent to define the connector 80. At this time, the first and second side wall members 82 and 84 are formed at positions corresponding to each other, and a coupling rod 85 for coupling the connector with the wiper arm is further installed between the first and second side wall members 82 and 84.

Figure 1:
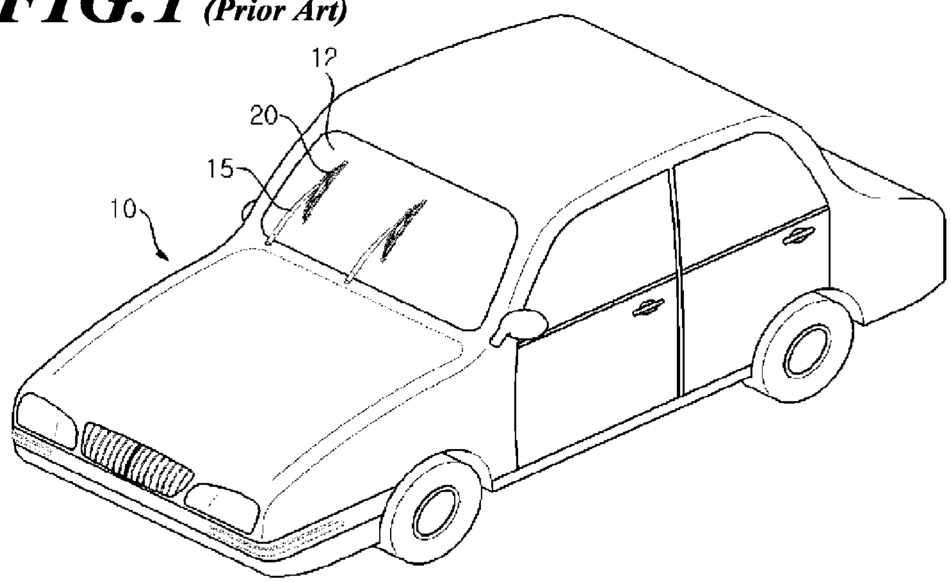
FIG. 1 is a perspective view of a vehicle to which a conventional wiper blade is mounted.
Figure 2:
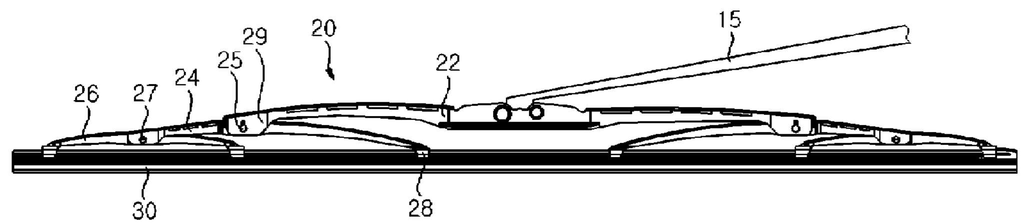
FIG. 2 is a front view of the conventional wiper blade.

Also, in a case where the wiper frame 70 is slantingly coupled with the wiper strip 60, one of the first and second side wall members 82 and 84, which is formed in the downward inclined side of the wiper frame 70, (e.g., the first side wall member 82) is formed to extend from the wiper frame 70 more than the other side wall member (e.g., the second wall member 84) so as to dispose both the side wall members to have the same level when they are bent. The wiper frame 70 exerts a certain elastic force to the wiper strip 60 such that the wiper strip 60 is brought into close contact with a windshield 12 (FIG. 1). To this end, the wiper frame 70 is made of a thin metal plate and is formed to be curved along the lengthwise direction.

Figure 6:
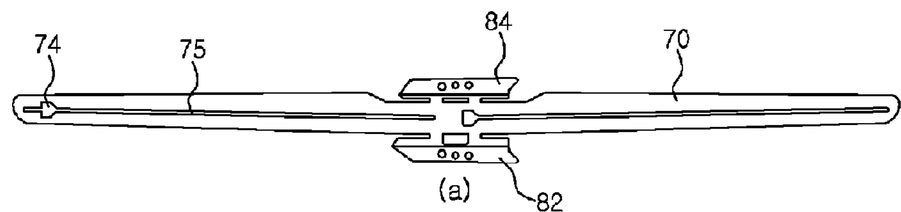
FIGS. 6 (*a*) and (*b*) are plane views showing a wiper frame of the wiper blade according to the present invention.
Figure 6:
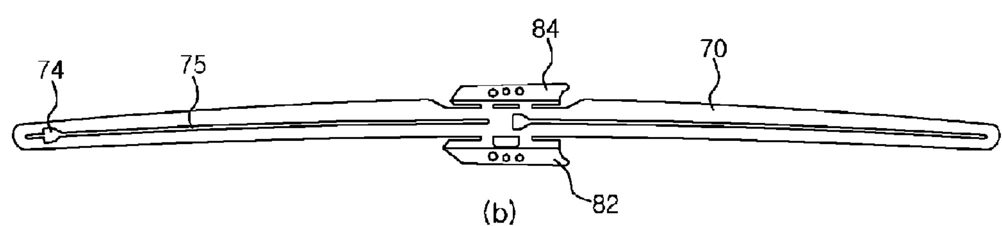

Also, both ends of the wiper frame may protrude forward as shown in FIG. 6 (*a*), or rearward as shown in FIG. 6 (*b*).

That is, the wiper blade 50 may be curved toward one of the right side and the left side as viewed from the top, Also, the wiper frame 70 may be arranged slantingly to be inclined at a predetermined angle in order to bring the wiper strip 60 into more close contact with the windshield by the wind. When the wiper frame 70 is arranged to be inclined as described above, the wiper strip 60 is formed to be inclined with respect to the wiper frame 70 so as to be brought into perpendicular contact with the windshield.

To this end, the wiper strip 60 has a coupling section 64 formed in an upper end portion of a body portion 62. The coupling section 64 is formed with rail grooves 65 which are opened to both sides and coupled with the wiper frame 70. Also, a strip portion 66 is formed in a lower end portion of the body portion 62 to be brought into contact with a surface of a windshield and to wipe the windshield according to the operation of the wiper arm.

The coupling section 64 of the wiper strip 60 is formed to be inclined with respect to a moving direction of the wiper strip 60, so that the wiper frame 70 to be coupled with the rail grooves 65 is also formed to be inclined. Also, the wiper frame 70 comprises coupling slits 75 extending in the lengthwise direction. At this time, each coupling slit 75, which is a structure for coupling the wiper strip 60 thereto, has a predetermined width such that the rail grooves 65 of the wiper strip 60 can be fitted to the coupling slit.

In addition, a coupling aperture 74 is formed at one end of each coupling slit 75 so that a portion of the coupling section 64 of the wiper strip 60 can be disposed in the coupling aperture in order to fit the rail grooves 65 of the wiper strip 60 to the coupling slit.

An end of the coupling aperture 74 connected to the coupling slit 75 is formed to be inclined in the fitting direction of the wiper strip 60, and thus guides so that the rail grooves 65 of the wiper strip 60 are fitted to the coupling slit 75.

In the meantime, only one of the coupling slits 75 may be formed in the wiper frame 70. However, it is preferred that a plurality of coupling slits be successively formed in order to maintain the rigidity of the wiper frame 70 and make it easy to couple the wiper strip 60 thereto.

Also, the wiper strip 60 is formed such that its upper end portion corresponds to the coupling slits 75 of the wiper frame 70. That is, a cut-out portion 69 is formed in the coupling section 64 of the wiper strip 60 by cutting out a part of the coupling section 64 corresponding to a portion in which the coupling slit 75 is not formed.

In addition, the front side and the rear side of the wiper frame 70 are symmetrical in width with respect to the coupling slit 75. However, the wiper frame 70 may be formed such that any one of the widths of the front and rear sides thereof is larger than the other.

Figure 7:
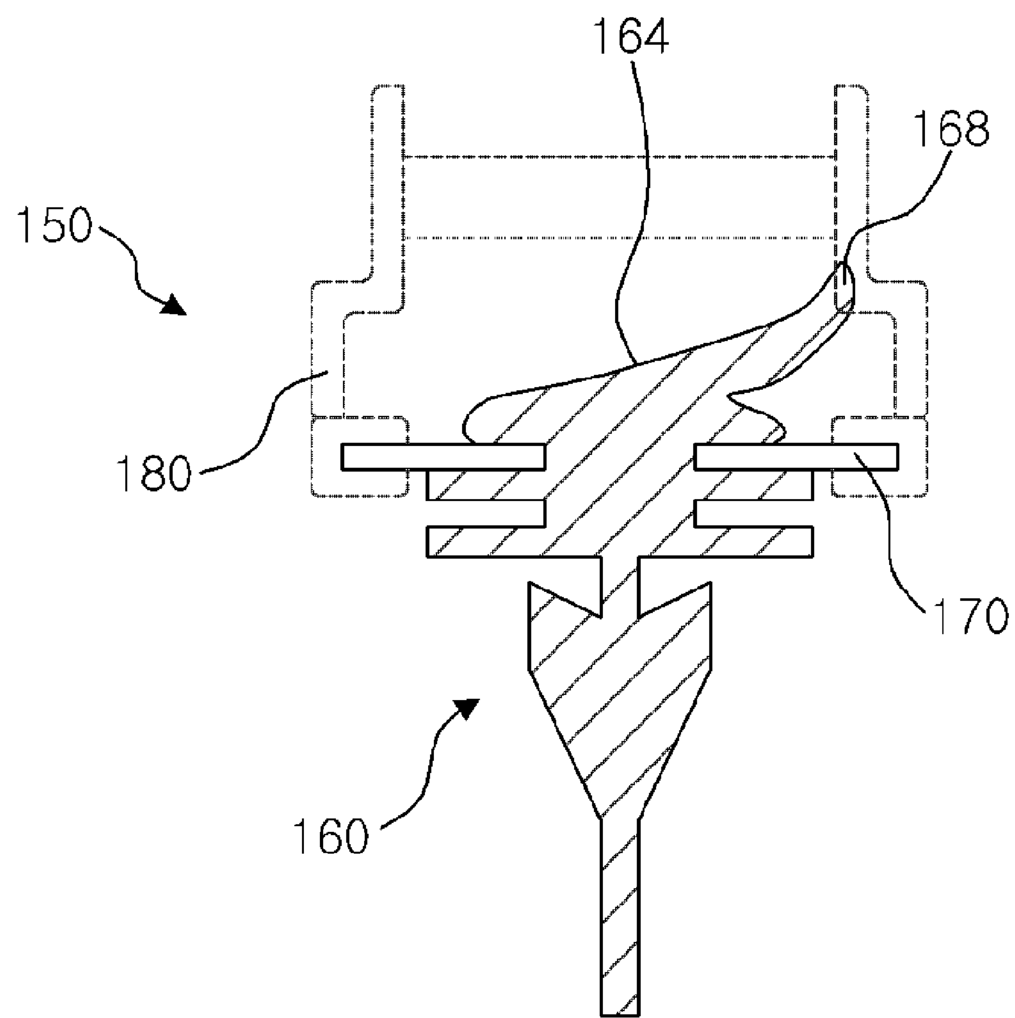
FIG. 7 is a sectional view of a wiper blade according to a modified embodiment according to the present invention.

As shown in FIG. 7, which is a sectional view of a wiper blade according to a modified embodiment according to the present invention, in a case where rail grooves 165 formed in a coupling section 164 of a wiper strip 160 are not inclined, a wiper frame 170 is combined with a connector 180 such that the wiper frame 170 is not inclined to the connector 180. In addition, the coupling section 164 may include a windbreak rib 168 for preventing a wiper blade 150 from being lifted up from the windshield by the wind when a vehicle is driven.

The windbreak rib is formed integrally with an upper portion of the coupling section 164 of the wiper strip 160 and may be formed such that its height is increased as it goes to the rear side.

The invention claimed is:

1. A wiper blade for coupling to a wiper arm of a vehicle to wipe a windshield, comprising:

a wiper strip having a coupling section formed to be inclined at a predetermined angle with respect to a reference plane perpendicularly aligned to a direction in which the wiper blade is adapted to make contact with the windshield; and a wiper frame curved along its lengthwise direction and having elasticity to bring the wiper strip into contact with the windshield when the wiper blade is positioned for use on the vehicle, the wiper frame coupled to the coupling section of the wiper strip at the predetermined angle, and the wiper frame including a connector formed integrally therewith, the connector defining a channel between a first upstanding side wall member formed on a first side of the wiper frame and a second upstanding side wall member formed on a second side of the wiper frame opposite the first side, the channel having a depth that varies with a distance from the first upstanding side wall member toward the second upstanding side wall member.

2. The wiper blade of claim 1 wherein the wiper frame comprises at least one coupling slit for coupling the wiper strip to the wiper frame, and the wiper strip is formed corresponding to the coupling slit.

3. The wiper blade as claimed in claim 2, wherein front and rear sides of the wiper frame are symmetrical in width with respect to the coupling slit.

4. The wiper blade as claimed in claim 2, wherein any one of widths of front and rear sides of the wiper frame is larger than the other.

5. A wiper blade for coupling to a wiper arm of a vehicle to wipe a windshield, comprising:

a wiper strip, the wiper strip having rail grooves inclined with respect to a reference plane perpendicularly aligned to a height of the wiper strip; and a wiper frame coupled to the rail grooves of the wiper strip and having a connector integrally formed therewith, the connector including opposing side wall members of different lengths for holding a coupling rod therebetween parallel to the reference plane.

6. The wiper blade of claim 5 wherein each of the opposing side wall members has an intermediate jog along a height thereof, a distance from a bottom surface of the wiper frame coupled to the rail grooves to the intermediate jog of one of the opposing side wall members being greater than a distance from the bottom surface to the intermediate jog of the other one of the opposing side wall members.

7. The wiper blade of claim 5 wherein an angle between a bottom surface of the wiper frame coupled to the rail grooves and one of the opposing side wall members is acute, and wherein an angle between the bottom surface and the other one of the opposing side wall members is obtuse.

* * * * *